US010598768B2

(12) United States Patent
Ortiz Egea (10) Patent No.: US 10,598,768 B2
(45) Date of Patent: Mar. 24, 2020

(54) MULTIPATH MITIGATION FOR TIME OF FLIGHT SYSTEM

(71) Applicant: Microsoft Technology Licensing, LLC, Redmond, WA (US)

(72) Inventor: Sergio Ortiz Egea, Mountain View, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 314 days.

(21) Appl. No.: 15/604,504

(22) Filed: May 24, 2017

(65) Prior Publication Data
US 2018/0341008 A1 Nov. 29, 2018

(51) Int. Cl.
| G01S 7/48 | (2006.01) |
| G01S 17/89 | (2020.01) |
| G01S 7/481 | (2006.01) |
| G01S 17/32 | (2020.01) |
| G01S 17/46 | (2006.01) |
| G01S 7/4915 | (2020.01) |

(52) U.S. Cl.
CPC .......... *G01S 7/4808* (2013.01); *G01S 7/4816* (2013.01); *G01S 17/32* (2013.01); *G01S 17/46* (2013.01); *G01S 17/89* (2013.01); *G01S 7/4915* (2013.01)

(58) Field of Classification Search
CPC ........ G01S 17/89; G01S 7/493; G01S 7/4815; G01S 7/484
See application file for complete search history.

(56) References Cited

U.S. PATENT DOCUMENTS

| 2007/0285422 | A1 | 12/2007 | Nayar et al. |
| 2014/0002445 | A1* | 1/2014 | Xiong .................. H04N 13/271 345/419 |
| 2014/0347553 | A1 | 11/2014 | Ovsiannikov et al. |
| 2015/0253429 | A1* | 9/2015 | Dorrington ............. G01S 17/89 356/5.01 |
| 2016/0334509 | A1 | 11/2016 | Gruenwald |
| 2017/0123067 | A1 | 5/2017 | Van Der Tempel |

OTHER PUBLICATIONS

"International Search Report and Written Opinion Issued in PCT Application No. PCT/US18/028978", dated Jul. 16, 2018, 13 Pages.

(Continued)

*Primary Examiner* — Luke D Ratcliffe
(74) *Attorney, Agent, or Firm* — Holzer Patel Drennan (57) ABSTRACT

A time-of-flight (ToF) system disclosed herein provides a method of separating a direct component of light collected by a time of flight (ToF) detector from a global component of light collected by the ToF detector by acquiring a first image represented by a first matrix in response to illuminating a target with a light source using a first spatial pattern, acquiring a second image represented by a second matrix in response to illuminating the target with the light source using a second spatial pattern, the second spatial pattern being different than the first spatial pattern, and determining one or more parameters of the direct component of light and the global component of light based on analysis of the first matrix and the second matrix.

20 Claims, 6 Drawing Sheets

(56) References Cited

OTHER PUBLICATIONS

Naik, et al., "A Light Transport Model for Mitigating Multipath Interference in Time-of-flight Sensors", In Proceedings of the IEEE Conference on Computer Vision and Pattern Recognition, Jun. 7, 2015, pp. 73-81.

Nayar, et al., "Fast Separation of Direct and Global Components of a Scene using High Frequency Illumination", In Proceedings of ACM Transactions on Graphics (TOG), vol. 25, No. 3, Jul. 30, 2006, 10 pages.

Feigin, et al., "Modeling "wiggling" as a multi-path interference problem in AMCW ToF imaging", In Journal of Optics Express, vol. 23, Issue 15, Jul. 16, 2015, pp. 19213-19225.

Freedman, et al., "SRA: Fast Removal of General Multipath for ToF Sensors", In Proceedings of European Conference on Computer Vision, Sep. 6, 2014, pp. 234-249.

Son, et al., "Learning to Remove Multipath Distortions in Time-of-Flight Range Images for a Robotic Arm Setup", In Technical report TR2016-036, May 2016, 10 pages.

Gupta, et al., "(De) Focusing on Global Light Transport for Active Scene Recovery *", In Proceedings of IEEE Conference on Computer Vision and Pattern Recognition, Jun. 20, 2009, 8 pages.

Garces, et al., "Low Cost Decomposition of Direct and Global Illumination in Real Scenes", In proceedings of Spanish Computer Graphics Conference, Jul. 1, 2015, 8 pages.

Rushmeier, et al., "Experiments with a low-cost system for computer graphics material model acquisition", In Journal of In SPIE/IS&T Electronic Imaging, Mar. 2015, 9 pages.

Chandraker, et al., "On the Duality of Forward and Inverse Light Transport", In Journal of IEEE Transactions on Pattern Analysis and Machine Intelligence, vol. 33, Issue 10, Oct. 2011, pp. 1-8.

Tanaka, et al., "Recovering Transparent Shape from Time-of-Flight Distortion", In Proceedings of the IEEE Conference on Computer Vision and Pattern Recognition, Jun. 27, 2016, pp. 4387-4395.

* cited by examiner

MULTIPATH MITIGATION FOR TIME OF FLIGHT SYSTEM

BACKGROUND

Time-of-flight (ToF) systems produce a depth image of an object, each pixel of such image encoding the distance to the corresponding point in the object. In recent years, time-of-flight depth-imaging technology has become more accurate and more affordable. These advances are a consequence of improved imaging-array fabrication and intelligent post-processing, which garners improved signal-to-noise levels from the raw output of the array.

SUMMARY

A time-of-flight (ToF) system disclosed herein provides a method of separating a direct component of light collected by a time of flight (ToF) detector from a global component of light collected by the ToF detector by acquiring a first image represented by a first matrix in response to illuminating a target with a light source using a first spatial pattern, acquiring a second image represented by a second matrix in response to illuminating the target with the light source using a second spatial pattern, the second spatial pattern being different than the first spatial pattern, and determining one or more parameters of the direct component of light and the global component of light based on analysis of the first matrix and the second matrix.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTIONS

Time-of-flight (ToF) systems produce a depth image of an object or a scene, each pixel of such image encoding the distance to the corresponding point in the object or the scent. When a scene is illuminated by a source of light, the radiance of each point in the scene can be viewed as having two components—a direct component and a global component. The term "radiance" and "light," of a point on a surface are used herein interchangeably to refer to the amount of electromagnetic radiation leaving or arriving at that point on the surface. Here the direct component is due to the direct illumination of a point in the scene (referred to as the "scene point") by the source of light and the global component is due to the indirect illumination of the scene point. Such indirect illumination of the scene point may be due to interreflection of light between scene points, subsurface scatterning of light within a medium beneath the surface of the scene, volumetric scattering of light, diffusion of light by translucent surface, etc.

Figure 1:
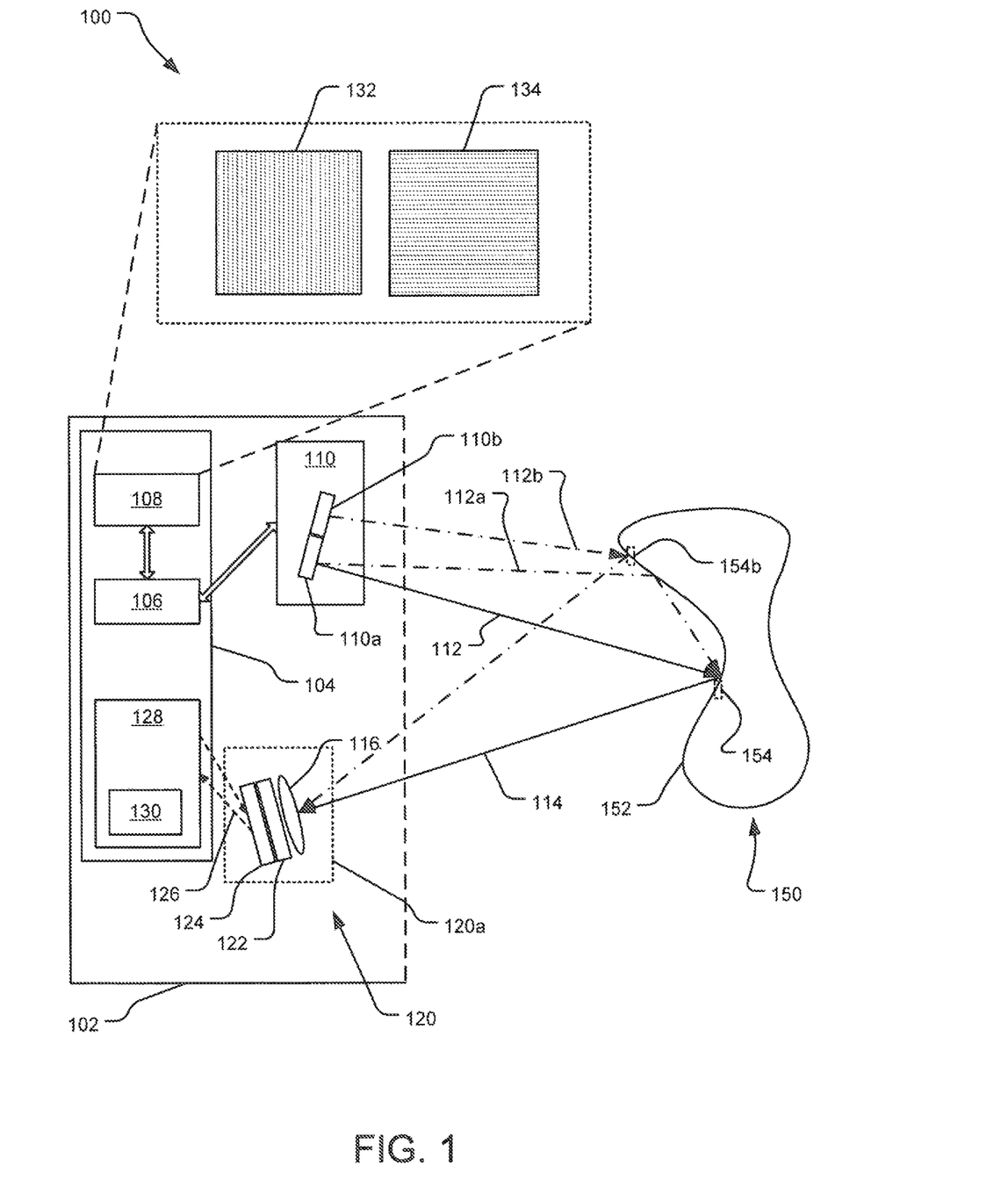
FIG. 1 illustrates an example implementation of a ToF system disclosed herein.

FIG. 1 illustrates a ToF system 100 including a ToF module 102 for separating a direct component of light collected by a time of flight (ToF) detector from a global component of light collected by the ToF detector. Specifically, a ToF module 102 may include a computing module 104 that includes a processor 106 and a spatial pattern data store 108. The spatial pattern data store 108 may store one or more spatial patterns, such as spatial patterns 132, 134 that may be used to spatially modulate illumination signal from a light source 110. The light source 110 may be a two-dimensional grid of light source elements, referred to as light source pixels. For example, the light source 110 may be an array of m×n light source elements, each light source element being a laser diode.

In one implementation, the processor 106 may communicate with the light source 110 to cause the illumination signal generated by the light source to be modulated by the spatial patterns 132, 134. For example, the spatial pattern 132 is a pattern of vertical lines and the spatial pattern 134 is a pattern of horizontal lines. The spatial patterns 132 and 134 are two dimensional patterns that map to the two-dimensional grid of light source elements 110a, 110b. Additionally, other patterns such as a dot-pattern may also be used to modulate the illumination signal generated by the light source.

The light source 110 may include a large number of light source pixels. The illustrated implementation shows one such light source pixel 110a generating a light signal that is projected on a surface 152 of an object 150. The light signal generated by the light source pixel 110a may include a direct light component 112 and a global light component 112a. Specifically, the direct light component 112 is directly incident on a point 154 on the surface 152 whereas the global light component 112a is incident on the point 154 indirectly as a result of an interreflection. The scattering of each of the direct light component 112 and the global light component 112a at the point 154 results in a total light signal 114 that is captured by a camera 120 of the ToF module 102.

An implementation of the camera 120 includes a plurality of camera pixels including a camera pixel 120a, wherein each camera pixel is assumed to be able to observe at most one significant scattering event from the surface 152. As a result, is assumed that two different light source pixels cannot produce a direct light component along a given camera pixels line of sight. FIG. 1 illustrates one such camera pixel including its imaging lens 116, a light sampling array 124, and a sampler 124. For example, the sampling array 122 may be a charge coupled device (CCD) array that converts light energy into electrical charge in analog form. The sampler 124 may include an analog-digital converter (ADC) that converts the electrical charge into a digital signal. The combination of the imaging lens 116, the light sampling array 124, and the sampler 124 receives and converts the total light signal 114 into a sampled signal 126 that is communicated to a multipath mitigation module 128.

The multipath mitigation module 128 includes an image analyzer 130 that analyzes images captured by the camera 120 to determine various parameters of a direct component and a global component of the total light signal 114.

In one implementation, the light source 110 and the camera 120 may have same number of pixels represented by a matrix with a resolution of m×n such that m is number of rows and n is the number of columns. Each pixel of the camera 120 may be represented by (i, j), with i=1, 2, . . . , m and j=1, 2, . . . n. In such an implementation, the light P collected by each pixel of a continuous wave time-of-flight (CW ToF) camera can be represented by $P_{i,j}$. Specifically, as the total light 114 is a combination of the scattering of the direct light component 112 and a global light component 112a, $P_{i,j}$ is a linear combination of a direction component of light $P_d(i, j)$ and a global component of light $P_g(i, j)$, as disclosed below in equation 1.

$$P_{i,j} = P_d(i,j) + P_g(i,j) \qquad (1)$$

Here the direct component of light $P_d(i, j)$ can be defined as the light for which the origin is the source pixel 110a and it is backreflected directly by the point 154 of the surface 152. The global component of the light $P_g(i,j)$ includes feasible contribution of various global components, including the back-reflected light collected by the camera pixel (i, j) other than the light for which the origin is the source pixel 110a and it is backreflected directly by the point 154 of the surface 152. Thus the global component of the light $P_g(i,j)$ includes global light component 112a reflected at point 154 or light coming from other light sources such as light 112b from a source pixel 110b backreflected directly by the another point 154b, and other illumination sources or the contribution of the ambient light.

The signal $P_{i,j}$ received by the camera pixel 120a is a complex number that can be written in phasor notation as the multiplication of the amplitude A and the complex exponential of the associated angle ϕ. Specifically, as the signal $P_{i,j}$ is a linear combination of the direct and global component of the light, Denominating the direct component of the light with the subscript d and the global component with the subscript g, the signal $P_{i,j}$ at the camera pixel 120a may be disclosed as per the equation 2 below:

$$P_{i,j} = A e^{i\phi} = A_d e^{i\phi_d} + A_g e^{i\phi_g} \qquad (2)$$

When the amplitude and phase of the global light component 112a are non-zero, the time of flight distance calculated for the total light signal 114 as well the magnitude of the total light signal 114 are modified compared to when the amplitude and phase of the global light component 112a are zero.

Combination of Uniform and Pattern

The ToF system 100, the processor 106 temporally modulates the source light generated by the light source 110 using the spatial patterns 132, 134. In one implementation, the processor 106 temporally modulates the source light generated by the light source 110 such that alternate source light images are modulated using one of the spatial patterns 132, 134 and alternate images are unmodulated. In one such implementation, at time interval $t_0$, the light source 110 is unmodulated, at time source $t_1$, the light source 110 is modulated by the spatial pattern 132, at time $t_2$ light source 110 is unmodulated, at time $t_3$ the light source 110 is modulated by the spatial pattern 132, etc. In an alternative implementation, the spatial pattern 134 may be used in a similar manner to modulate the source light generated by the light source 110. In one implementation, the processor 106 modulates the source light using one of the spatial patterns 132 and 134 in the manner described above at a single temporal modulation frequency.

Note that while the illustrated implementation discloses only two different spatial patterns 132 and 134, in alternative implementations other spatial patterns may also be stored in the spatial pattern data store 108 and used by the processor 106 to modulate the source light images generated by the light source 110. In one implementation, the processor 106 modulates the source light using each of the spatial patterns 132 and 134 in the manner described above at a single temporal modulation frequency.

The modulated source light illuminates the object 150. The camera 120 acquires the total light 114 scattered by the object 150 in response to the illumination by the modulated source light. Specifically, the camera 120 acquires two images of the object 150 at the camera 120 at the single temporal modulation frequency to separate the direction component of light $P_d(i,j)$ and the global component of light $P_g(i,j)$. When the source light is modulated using alternative source light image with no pattern and alternative source light image using one of the spatial patterns 132, 134, the image acquired at the camera 120 when no pattern (or uniform pattern) is used to modulate the source light 110 can be represented by U as provided below in equation 3, while the image acquired at the camera 120 when one of the spatial patterns 132, 134 is used to modulate the source light 110 can be represented by P as provided below in equation 3.

$$U = A^u e^{i\phi^u} = A_d^u e^{i\phi_d^u} + A_g^u e^{i\phi_g^u}$$

$$P = A^p e^{i\phi^p} = A_d^p e^{i\phi_d^p} + A_g^p e^{i\phi_g^p} \qquad (3)$$

Note that each of the U and P represent matrices. Thus, U represents a matrix $U_{i\times j}$, with (i, j), with i=1, 2, . . . , m and j=1, 2, . . . n. Here $A^u$ is the amplitude of the image acquired at the camera 120 when no pattern is used to modulate the source light 110 and $A^p$ is the amplitude of the image acquired at the camera 120 when one of the spatial patterns 132, 134 is used to modulate the source light 110. As seen from equation 2, each of the U and P has a direct component and a global component. The amplitudes of the direct component and the global components for each of the U and P are represented by, respectively, $A_d^u$, $A_g^u$, $A_d^p$, and $A_g^p$. While the phases of the direct component and the global components for each of the U and P are represented by, respectively, $\phi_d^u$, $\phi_g^u$, $\phi_d^p$, and $\phi_g^p$.

There is an intrinsic relationship between the uniform amplitudes $A_d^u$, $A_g^u$, $A_d^p$, and $A_g^p$ and parameters of the pattern used to modulate the alternate source light images. For example, if the immediate contrast, being the contrast imposed by the pattern for the specific pixel of the spatial pattern used to modulate alternate source light image, is given by γ and the average contrast, being the loss of intensity regarding to the uniform illumination due to the pattern of the spatial pattern used to modulate alternate source light image, is given by C, the relation between the uniform amplitudes $A_d^u$, $A_g^u$, $A_d^p$, and $A_g^p$ and the parameters γ and C can be given by the equation 4 below.

$$A_d^p = \gamma \cdot A_d^u = \gamma \cdot A_d$$

$$A_g^p = C \cdot A_g^u = C \cdot A_g \qquad (4)$$

In one implementation, the average contrast C is calculated as the median of the duty cycle of the pattern 132 or 134. The immediate contrast γ may be obtained from calibration of the pattern 132 or 134. Alternatively, for regimes where $A_d > A_g$, the γ may be calculated as $$\gamma = \frac{|Pp|}{|P_u|}.$$

Furthermore, the relation between the phases $\phi_d^u$, $\phi_g^u$, $\phi_d^p$, and $\phi_g^p$ is given by equation 5 below.

$$\phi_d = \phi_d^u = \phi_d^p$$

$$\phi_g = \phi_g^u = \phi_g^p \quad (5)$$

The relations given by the equations 3, 4, and 5 can be solved to result in the equation 6 below.

$$U = A_d e^{i\phi_d} + A_g e^{i\phi_g}$$

$$P = \gamma \cdot A_d e^{i\phi_d} + C \cdot A_g e^{i\phi_g} \quad (6)$$

To solve these equations, they may be rewritten as follows:

$$U_r = D_r + G_r$$

$$U_c = D_c + G_c$$

$$P_r = \gamma \cdot D_r + C \cdot G_r$$

$$P_c = \gamma \cdot D_c + C \cdot G_c \quad (7)$$

In equation 7 above, the subscripts r and c denote the real and the complex parts of the phasors. D is the direct component of the total light 114 captured by a pixel of the camera 120 and G is the global component of the total light 114 captured by a pixel of the camera 120. Solving these equations, the values of the variables $\{D_r, D_c, G_r, G_c\}$ may be provided by equation 8 below:

$$D_r = \frac{-P_r + CU_r}{C - \gamma}$$

$$D_c = \frac{-P_c + CU_c}{C - \gamma}$$

$$G_r = \frac{-P_r + \gamma U_r}{C - \gamma}$$

$$G_c = \frac{-P_c + \gamma U_c}{C - \gamma} \quad (8)$$

The multipath mitigation module 128 may solve one or more of the above values for each pixel of the camera 120 using the sampled values of the image U-acquired at the camera 120 when no pattern is used to modulate the source light 110, and the image P-acquired at the camera 120 when one of the spatial patterns 132 or 134 is used to modulate the source light 110. Using the real and complex components of U and P, the multipath mitigation module 128 may solve for the values of the variables $\{D_r, D_c, G_r, G_c\}$ using equation 8 above.

Furthermore, the multipath mitigation module 128 may also use the acquired values of the real and complex components of U and P to calculate phase values that are used in an unwrapping algorithm to determine the distance of the point 154.

For example, if N temporal modulation frequencies ($\omega_N$) are used with the uniform pattern (no pattern) and the pattern 132 or 134 for a total of 2N images, the direct phase component is calculated for every modulation frequency $\omega_N$ by equation 9 below:

$$\phi_d(\omega_N) = \text{atan}\left(\frac{-P_c(\omega_N) + CU_c(\omega_N)}{-P_r(\omega_N) + CU_r(\omega_N)}\right) \quad (9)$$

The result of these N phase calculations may be directly used by the processor 106 in an unwrapping algorithm to be transformed into a distance for the point 154.

On the other hand, if N temporal modulation frequencies ($\omega_j$) with j=1, 2, . . . , N are used with the uniform illumination (no pattern) and only one of them with the pattern 132 or 134, a total of N+1 images are captured at the camera 120. If $\omega_i$ i∈[1, N] the frequency selected for performing the acquisition with the spatial pattern, the amplitudes of the direct component and the global $\{A_d, A_g\}$ and the phases of the direct and global components $\{\phi_d, \phi_g\}$ for the temporal frequency $\omega_i$ are calculated as per Equation 10 below:

$$A_d = \frac{\sqrt{(-P_r + CU_r)^2 + (-P_c + CU_c)^2}}{C - \gamma} \quad (10)$$

$$A_g = \frac{\sqrt{(-P_r + \gamma U_r)^2 + (-P_c + \gamma U_c)^2}}{C - \gamma}$$

$$\phi_d = \text{atan}\left(\frac{-P_c + CU_c}{-P_r + CU_r}\right)$$

$$\phi_g = \text{atan}\left(\frac{-P_c + \gamma U_c}{-P_r + \gamma U_r}\right)$$

Furthermore, an array of different harmonics is generated, for the direct component of the light $\Phi_d$, by adding multiples of $\pi$ such as given by equation 11 below:

$$\Phi_d(\omega_i) = \phi_d(\omega_i) + n\pi \; n = 0, 1, \ldots \quad (11)$$

The processor 106 may use these harmonic values $\Phi_d(\omega_i)$ to reconstruct the phases for the rest of the other temporal frequencies different of the one used to obtain the components $\{A_d, A_g, \phi_d, \phi_g\}$. The angular reconstruction of the phases is produced by multiplying the global and direct components $\{\Phi_d, \phi_g\}$ by the ratio between frequencies as provided below in equation 12:

$$\Phi_d(\omega_j) = \Phi_d(\omega_i) \frac{\omega_j}{\omega_i} \quad (12)$$

$$\phi_g(j) = \phi_g(\omega_i) \frac{\omega_j}{\omega_i}$$

$$j = 1, 2, \ldots, N$$

Combination of Two Patterns

Note than in the discussion above, the processor 106 temporally modulates the source light generated by the light source 110 alternately with either a uniform illumination (no pattern) or using one of the spatial patterns 132, 134. Alternatively, the processor 106 may temporally modulate the source light generated by the light source 110 such that alternate source light images are modulated using one of the spatial patterns 132, 134. In one such implementation, at time interval $t_0$, the light source 110 is modulated by the spatial pattern 132, at time source $t_1$, the light source 110 is modulated by the spatial pattern 134, at time $t_2$ light source 110 is modulated by the spatial pattern 132, at time $t_3$ the light source 110 is modulated by the spatial pattern 134, etc.

In such an implementation, the ToF system 100 uses two acquisitions for a single temporal modulation frequency to separate the direct component from the global component, by means of the projection of two different spatial patterns. Specifically, the acquisition with the first pattern is denominated $P_a$, while the acquisition with the other spatial pattern is denominated $P_b$, which can be provided by equation 13 below:

In this method, a way of solving these equations is provided by re-writing them. If the underscript r, and c denominate the real and complex part of the phasors, D is the direct component of the total light 114 captured by a pixel of the camera 120 and G is the global component of the total light 114 captured by a pixel of the camera 120, the relation in Equation 13 may be rewritten as follows:

$$P_r^a = \gamma_a \cdot D_r + C_a \cdot G_r$$

$$P_c^a = \gamma_a \cdot D_c + C_a \cdot G_c$$

$$P_r^b = \gamma_b \cdot D_r + C_b \cdot G_r$$

$$P_c^b = \gamma_b \cdot D_c + C_b \cdot G_c \quad (14)$$

Solving the system of equations, the variables $\{D_r, D_c, G_r, G_c\}$ take the form as provided below by equation 15:

$$D_r = \frac{C_b P_r^a - C_a P_r^b}{\gamma_a C_b - \gamma_b C_a} \quad (15)$$

$$D_c = \frac{C_b P_c^a - C_a P_c^b}{\gamma_a C_b - \gamma_b C_a}$$

$$G_r = \frac{\gamma_b P_r^a - \gamma_a P_r^b}{\gamma_a C_b - \gamma_b C_a}$$

$$G_c = \frac{\gamma_b P_c^a - \gamma_a P_c^b}{\gamma_a C_b - \gamma_b C_a}$$

The multipath mitigation module 128 may solve one or more of the above values $\{D_r, D_c, G_r, G_c\}$ for each pixel of the camera 120 using the sampled values of the image $P^a$-acquired at the camera 120 when a first pattern (such as the pattern 132) is used to modulate the source light 110, and the image $P^b$-acquired at the camera 120 when the second pattern (such as the pattern 134) is used to modulate the source light 110. Using the real and complex components of $P^a$ and $P^b$, the multipath mitigation module 128 may solve for the values of the variables $\{D_r, D_c, G_r, G_c\}$ using equation 15 above.

Furthermore, the multipath mitigation module 128 may also use the acquired values of the real and complex components of $P^a$ and $P^b$ to calculate phase values that are used in an unwrapping algorithm to determine the distance of the point 154.

For example, if N temporal modulation frequencies ($\omega_N$) are used with the first pattern (such as pattern 132) and the second pattern (such as pattern 132) for a total of 2N images, the direct phase component is calculated for every modulation frequency $\omega_N$ by equation 16 below:

$$\phi_d(\omega_N) = \operatorname{atan}\left(\frac{C_b(\omega_N) P_c^a(\omega_N) - C_a(\omega_N) P_c^b(\omega_N)}{C_b(\omega_N) P_r^a(\omega_N) - C_a(\omega_N) P_r^b(\omega_N)}\right) \quad (16)$$

The result of these N phase calculations is directly used in the unwrapping algorithm to be transformed into a distance.

On the other hand, if N temporal modulation frequencies ($\omega_j$) with j=1, 2, . . . , N are used with the first pattern (such as the pattern 132) and only one of them with the second pattern (such as the pattern 134), a total of N+1 images are captured at the camera 120. If $\omega_i$ i∈[1, N] the frequency selected for performing the acquisition with the spatial pattern, the amplitudes of the direct component and the global $\{A_d, A_g\}$ and the phases of the direct and global components $\{\phi_d, \phi_g\}$ for the temporal frequency $\omega_i$ are calculated as per Equation 17 below:

$$A_d = \frac{\sqrt{(C_b P_r^a - C_a P_r^b)^2 + (C_b P_c^a - C_a P_c^b)^2}}{\gamma_a C_b - \gamma_b C_a} \quad (17)$$

$$A_g = \frac{\sqrt{(\gamma_b P_r^a - \gamma_a P_r^b)^2 + (\gamma_b P_c^a - \gamma_a P_c^b)^2}}{\gamma_a C_b - \gamma_b C_a}$$

$$\phi_d = \operatorname{atan}\left(\frac{C_b P_c^a - C_a P_c^b}{C_b P_r^a - C_a P_r^b}\right)$$

$$\phi_g = \operatorname{atan}\left(\frac{\gamma_b P_c^a - \gamma_a P_c^b}{\gamma_b P_r^a - \gamma_a P_r^b}\right)$$

Where the duty cycles, $\gamma_a$ and $\gamma_b$, are introduced in the equations by means of a calibration, and $C_a$ and $C_b$ are calculated as the median of the duty cycle of the patterns. An array of different harmonics is generated, for the direct component of the light $\Phi_d$, by adding multiples of $\pi$ such as Eq. 18:

$$\Phi_d(\omega_i) = \phi_d(\omega_i) + n\pi \quad n=0,1,\ldots \quad (18)$$

The processor 106 may use these harmonic values $\Phi_d(\omega_i)$ to reconstruct the phases for the rest of the other temporal frequencies different of the one used to obtain the components $\{A_d, A_g, \phi_d, \phi_g\}$. The angular reconstruction of the phases is produced by multiplying the global and direct components $\{\Phi_d, \phi_g\}$ by the ratio between frequencies as provided below in equation 19:

$$\Phi_d(\omega_j) = \Phi_d(\omega_i) \frac{\omega_j}{\omega_i} \quad (19)$$

$$\phi_g(j) = \phi_g(\omega_i) \frac{\omega_j}{\omega_i}$$

$$j = 1, 2, \ldots, N$$

The ToF system 100 provides a physical model and an analytical solution for separating the direct component of the light from the global component that contains the multipath. The model can be applied to a discrete number of frequencies N or only applied to only one of the frequencies. Because the ToF system 100 works in separating the multipath component pixel-wise at individual pixels such as pixel 120a of the camera 120, it avoids working with the neighborhood of pixels and therefore minimizing the frontier problem such as edges. Furthermore, the analytic method used by the multipath mitigation module 128 is faster than other methodologies that require or intensive computation (ray tracing) and/or multiple images or image processing. Moreover, because the method works pixel wise, the frequency shifting or orientation of the projected pattern does not limit its efficacy.

Figure 2:
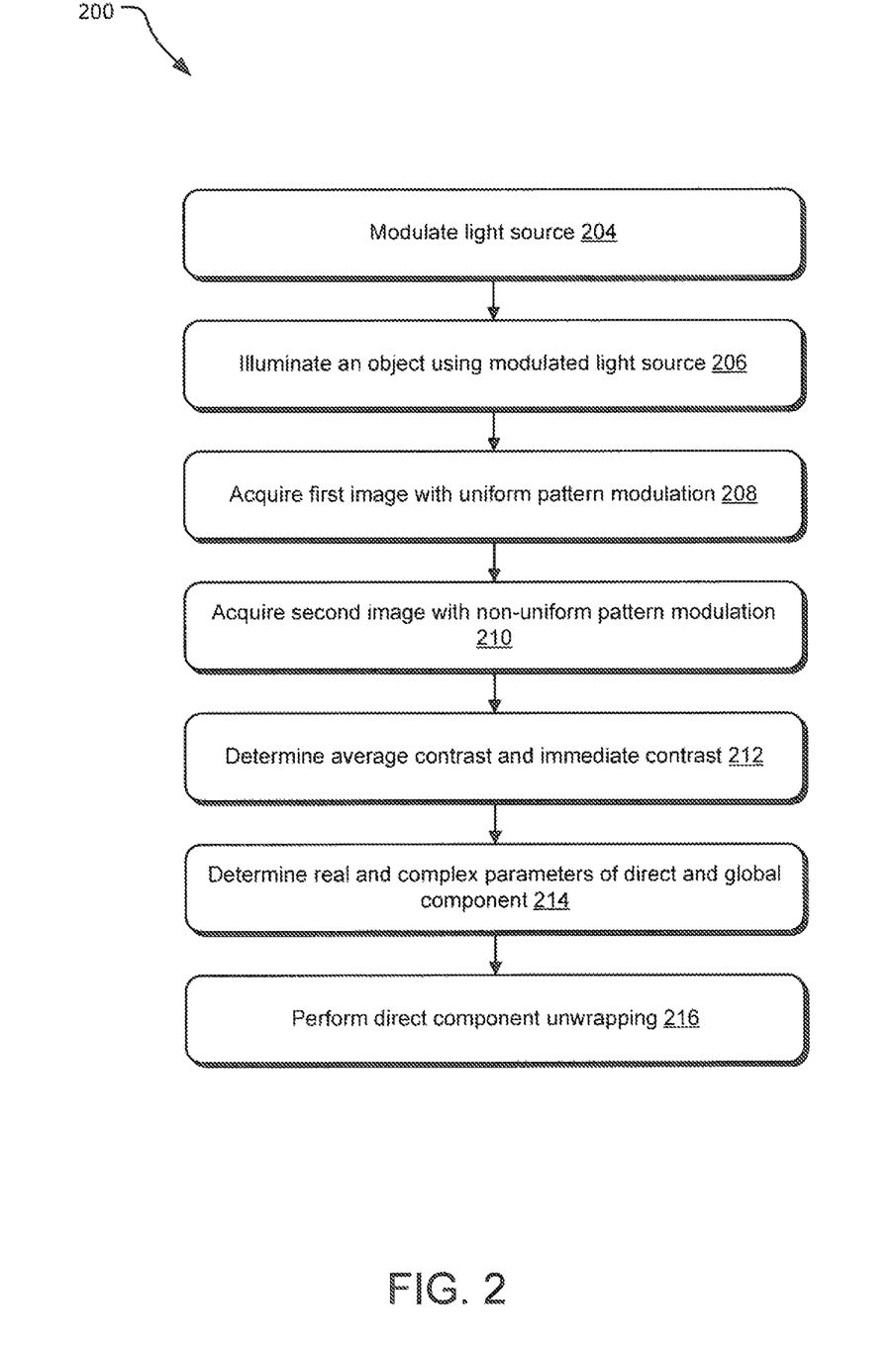
FIG. 2 illustrates example operations for separating a direct component of the light from a global component that contains the multipath.

FIG. 2 illustrates example operations 200 for separating the direct component of the light from the global component that contains the multipath. One or more operations 200 may be performed by the image analyzer 130 disclosed in FIG. 1. Specifically, an operation 204 modulates a light source (such as the light source 110 of FIG. 1) using one or more patterns (such as the patterns 132, 134, of FIG. 1) from a pattern data store. An operation 206 illuminates an object (such as the object 150 of FIG. 1) using the modulated light source. The modulated light is scattered from the object towards a camera (such as the camera 150 of FIG. 1).

An operation 208 acquires a first image where the object is illuminated with the light source being modulated with the uniform pattern. Similarly, an operation 210 acquires a second image where the object is illuminated with the light source being modulated with the non-uniform pattern. Each of the first image and the second image may in the form of a matrix with each observation of the matrix corresponding to individual pixels of the camera.

An operation 212 determines values of average contrast and immediate contrast of the non-uniform pattern. Using the first image, the second image, and the values of the average contrast and immediate contrast of the non-uniform pattern, an operation 214 determines real and complex parameters of direct and global components of a signal received at the camera. Optionally, an operation 216 may unwrap the direct component of the signal to determine the depth values of the object.

Figure 3:
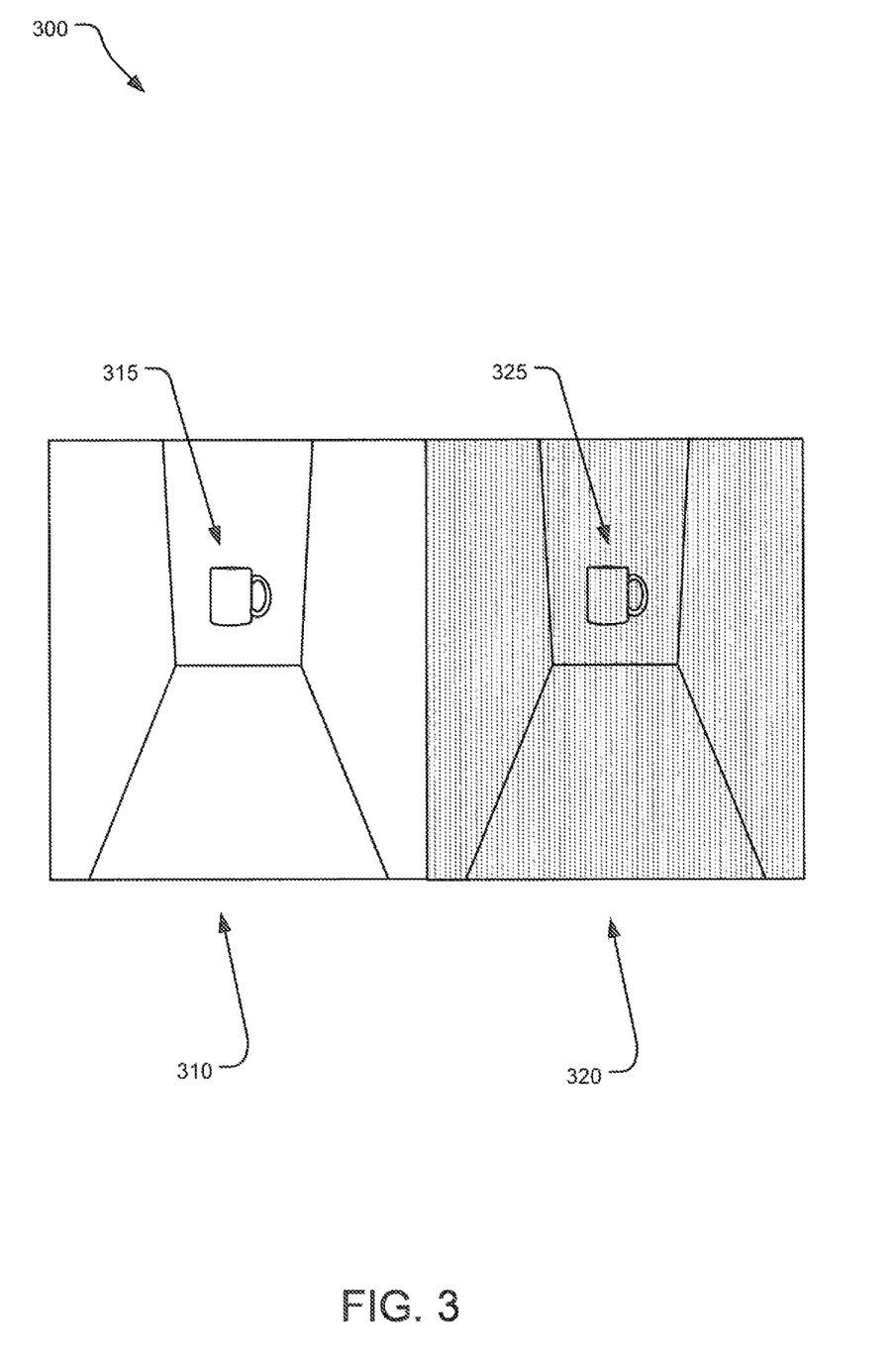
FIG. 3 illustrates an example of uniform illumination and patterned illumination of an object.

FIG. 3 illustrates an example 300 of uniform illumination and patterned illumination of an object. Specifically, the figure illustrates a uniform pattern (or no pattern) 310 illuminating a scene including an object 315 and a vertical bar pattern 320 illuminating a scene including an object 325. The signal received by a pixel of a camera (such as the camera 120 of FIG. 1) from the uniform pattern 310 at pixel (i, j) may be given by $P_u(i, j)$. On the other hand, a signal received by a pixel of a camera (such as the camera 120 of FIG. 1) from the vertical bar pattern 320 at pixel (i, j) may be given by $P_p(i, j)$.

Figure 4:
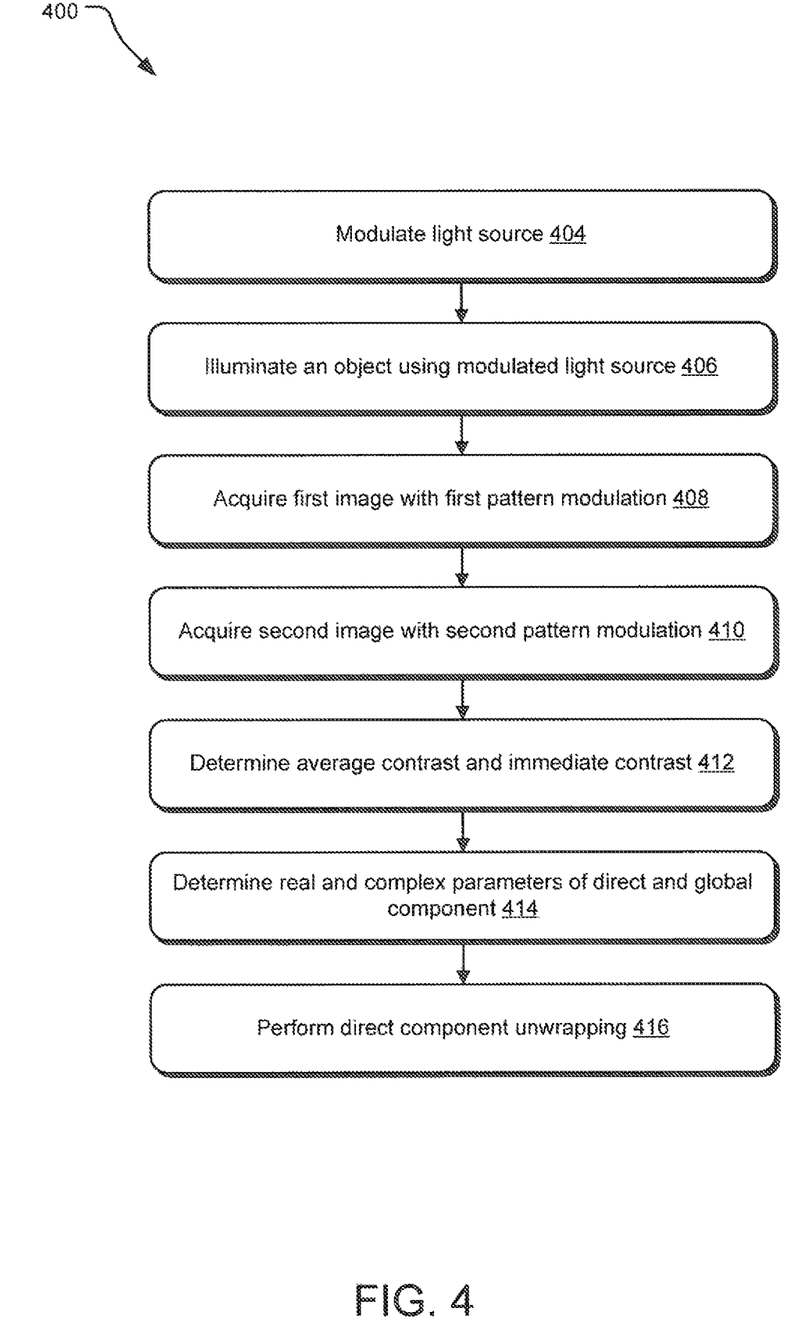
FIG. 4 illustrates alternative example operations for separating the direct component of the light from the global component that contains the multipath.

FIG. 4 illustrates example operations 400 for separating the direct component of the light from the global component that contains the multipath. One or more operations 400 may be performed by the image analyzer 130 disclosed in FIG. 1. Specifically, an operation 404 modulates a light source (such as the light source 110 of FIG. 1) using one or more patterns (such as the patterns 132, 134, of FIG. 1) from a pattern data store. An operation 406 illuminates an object (such as the object 150 of FIG. 1) using the modulated light source. The modulated light is scattered from the object towards a camera (such as the camera 150 of FIG. 1).

An operation 408 acquires a first image where the object is illuminated with the light source being modulated with the first pattern. Similarly, an operation 410 acquires a second image where the object is illuminated with the light source being modulated with the second pattern. Each of the first image and the second image may in the form of a matrix with each observation of the matrix corresponding to individual pixels of the camera.

An operation 212 determines values of average contrast and immediate contrast of the first and the second patterns. Using the first image, the second image, and the values of the average contrast and immediate contrast of the first and the second patterns, an operation 414 determines real and complex parameters of direct and global components of a signal received at the camera. Optionally, an operation 416 may unwrap the direct component of the signal to determine the depth values of the object.

Figure 5:
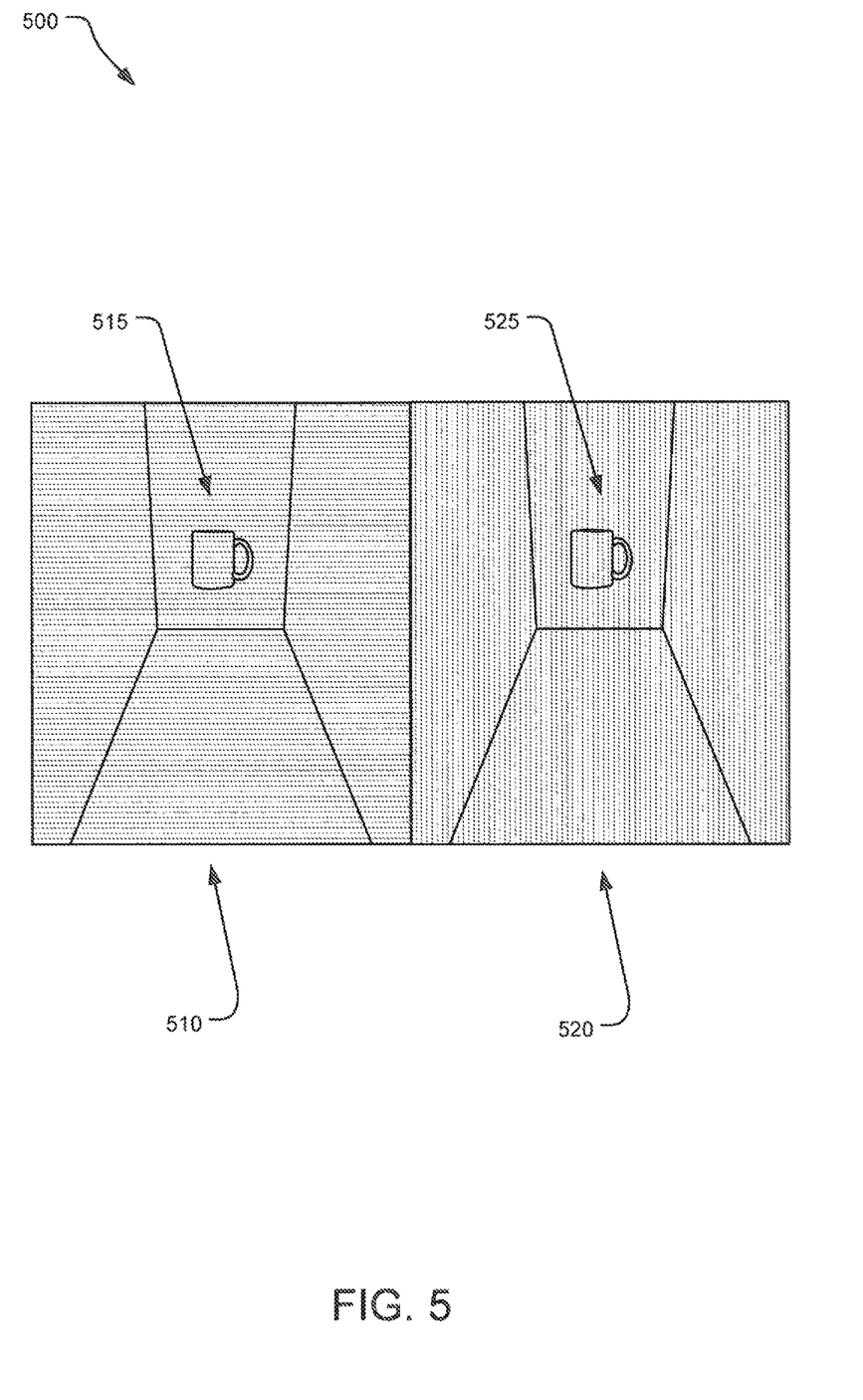
FIG. 5 illustrates an alternative example of patterned illumination of an object using different spatial patterns.

FIG. 5 illustrates an example 500 of patterned illumination of an object using different spatial patterns. Specifically, the figure illustrates a horizontal bar pattern 510 illuminating a scene including an object 515 and a vertical bar pattern 520 illuminating a scene including an object 525. The signal received by a pixel of a camera (such as the camera 120 of FIG. 1) from the horizontal bar pattern 510 at pixel (i, j) may be given by $P^a(i, j)$. On the other hand, a signal received by a pixel of a camera (such as the camera 120 of FIG. 1) from the vertical bar pattern 520 at pixel (i, j) may be given by $P^b(i, j)$.

Figure 6:
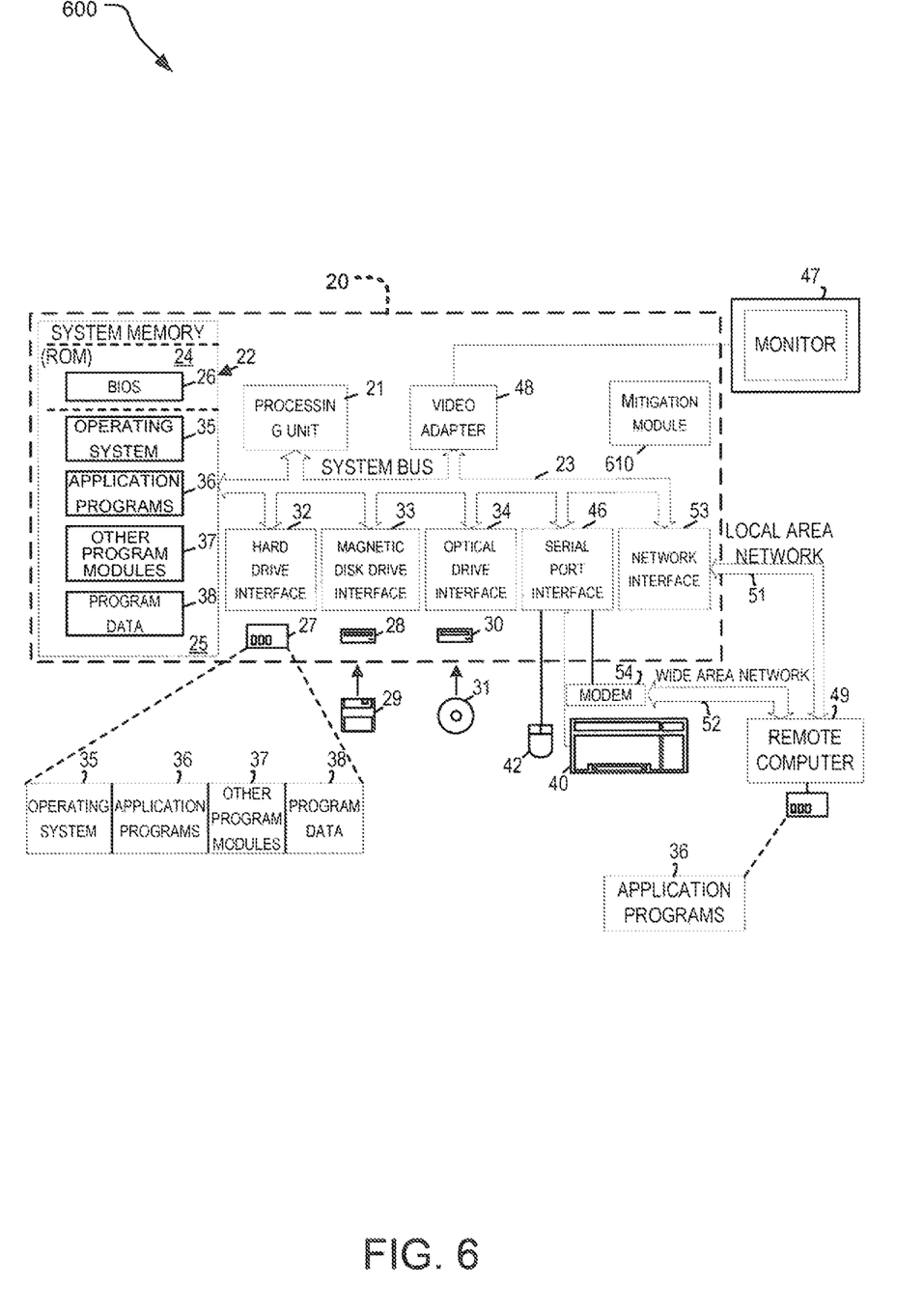
FIG. 6 illustrates an example system that may be useful in implementing the described technology.

FIG. 6 illustrates an example system 600 that may be useful in implementing the described ToF system with multi-frequency unwrapping. The example hardware and operating environment of FIG. 6 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk drive 29, optical disk drive 31, ROM 24, or RAM 25, including an operating system 35, one or more application programs 36, other program modules 37, and program data 38. A user may generate reminders on the computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-network environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are for example and other means of communications devices for establishing a communications link between the computers may be used.

In an example implementation, software or firmware instructions for doing multipath mitigation as disclosed in FIGS. 2 and 4 may be stored in system memory 22 and/or storage devices 29 or 31 and processed by the processing unit 21. One of more of the patterns 132 and 134 disclosed in FIG. 1 may be stored in system memory 22 and/or storage devices 29 or 31 as persistent datastores. The computer 20 also includes a mitigation module 610 that may be used to receive sampled light signals from a camera (such as the camera 120 of FIG. 1) and process the sampled signals to determine the direct component and the global component of the light signal. The mitigation module 610 may include an image analyzer such as the image analyzer 130 disclosed in FIG. 1.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The system for secure data onboarding may include a variety of tangible computer-readable storage media and intangible computer-readable communication signals. Tangible computer-readable storage can be embodied by any available media that can be accessed by the ToF system disclosed herein and includes both volatile and non-volatile storage media, removable and non-removable storage media. Tangible computer-readable storage media excludes intangible and transitory communications signals and includes volatile and non-volatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the ToF system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

The ToF system including multipath mitigation, as disclosed herein provides solution to a technological problem necessitated by the requirements of highly accurate depth perception information. Specifically, the multipath mitigation system disclosed herein provides an unconventional technical solution to this technological problem by providing a system and method that allows for efficient determination of parameters of direct component in a light signal received at a pixel of a camera and parameters of global component in the light signal received at a pixel of a camera by modulating a light source with pattern to generate patterned source light.

A physical hardware system to provide multipath mitigation in a time-of-flight (ToF) system includes a camera configured to acquire a first image represented by a first matrix in response to illuminating a target with a light source using a first spatial pattern and to acquire a second image represented by a second matrix in response to illuminating the target with the light source using a second spatial pattern, the second spatial pattern being different than the first spatial pattern and an image analyzer to analyze the first matrix and the second matrix to determine one or more parameters of a direct component of light and a global component of light received at the camera from the target.

In one implementation of the physical hardware system the first spatial pattern is a uniform spatial pattern. In an alternative implementation of the physical hardware system, second spatial pattern is a non-uniform spatial pattern. In yet another implementation, each of the first spatial pattern and the second spatial pattern is a non-uniform spatial pattern. In one implementation, the light source illuminates a target using N temporal modulation frequencies with the first spatial pattern and one temporal modulation frequency with the second spatial pattern. Alternatively, the light source illuminates a target using N temporal modulation frequencies with the first spatial pattern and N temporal modulation frequency with the second spatial pattern. Yet alternatively, the non-uniform spatial pattern is at least one of a dot-pattern, a vertical-line pattern, and a horizontal line pattern.

A method of separating a direct component of light collected by a time of flight (ToF) detector from a global component of light collected by the ToF detector, includes acquiring a first image represented by a first matrix in response to illuminating a target with a light source using a first spatial pattern, acquiring a second image represented by a second matrix in response to illuminating the target with the light source using a second spatial pattern, the second spatial pattern being different than the first spatial pattern, and determining one or more parameters of the direct component of light and the global component of light based on analysis of the first matrix and the second matrix. In one implementation of the method, the first spatial pattern is a uniform spatial pattern. In another implementation, the second spatial pattern is a non-uniform spatial pattern.

Alternatively, each of the first spatial pattern and the second spatial pattern is a non-uniform spatial pattern. Yet alternatively, the light source illuminates a target using N temporal modulation frequencies with the first spatial pattern and one temporal modulation frequency with the second spatial pattern. In an alternative implementation, the non-uniform spatial pattern is one of a dot-pattern, a vertical line pattern, and a horizontal line pattern.

A physical article of manufacture including one or more tangible computer-readable storage media, encoding computer-executable instructions for executing on a computer system a computer process, the computer process includes acquiring a first image represented by a first matrix in response to illuminating a target with a light source using a first spatial pattern, acquiring a second image represented by a second matrix in response to illuminating the target with the light source using a second spatial pattern, the second spatial pattern being different than the first spatial pattern, and determining one or more parameters of the direct component of light and the global component of light based on analysis of the first matrix and the second matrix In one implementation, the first spatial pattern is a uniform spatial pattern and the second spatial pattern is a non-uniform spatial pattern. Alternatively, the light source illuminates a target using N temporal modulation frequencies with the uniform spatial pattern and one temporal modulation frequency with the non-uniform spatial pattern. Yet alternatively, each of the first spatial pattern and the second spatial pattern is a non-uniform spatial pattern. In one implementation, the light source illuminates a target using N temporal modulation frequencies with the uniform spatial pattern and N temporal modulation frequencies with the non-uniform spatial pattern.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical hardware system to provide multipath mitigation in a time-of-flight (ToF) system, comprising:
    a camera configured to acquire a first image represented by a first matrix in response to illuminating a target with a light source using a first spatial pattern and to acquire a second image represented by a second matrix in response to illuminating the target with the light source using a second spatial pattern, the second spatial pattern being different than the first spatial pattern; and
    an image analyzer configured to analyze the first matrix and the second matrix to determine one or more parameters of a direct component of light and a global component of light received at the camera from the target, wherein the light source illuminates a target using N temporal modulation frequencies with the first spatial pattern and with less than N temporal modulation frequencies with the second spatial pattern.

2. The physical hardware system of claim 1, wherein the first spatial pattern is a uniform spatial pattern.

3. The physical hardware system of claim 1, wherein the second spatial pattern is a non-uniform spatial pattern.

4. The physical hardware system of claim 1, wherein each of the first spatial pattern and the second spatial pattern is a non-uniform spatial pattern.

5. The physical hardware system of claim 1, wherein the light source illuminates the target using one temporal modulation frequency with the second spatial pattern.

6. The physical hardware system of claim 1, further comprising determining a distance of the target based on the one or more parameters of the direct component of light and the global component of light.

7. The physical hardware system of claim 3, wherein the non-uniform spatial pattern is at least one of a dot-pattern, a vertical-line pattern, and a horizontal line pattern.

8. A method of separating a direct component of light collected by a time of flight (ToF) detector from a global component of light collected by the ToF detector, the method comprising:

illuminating a target using N temporal modulation frequencies with the first spatial pattern and with less than N temporal modulation frequencies with the second spatial pattern;

acquiring a first image represented by a first matrix in response to illuminating a target with a light source using a first spatial pattern;

acquiring a second image represented by a second matrix in response to illuminating the target with the light source using a second spatial pattern, the second spatial pattern being different than the first spatial pattern; and determining one or more parameters of the direct component of light and the global component of light based on analysis of the first matrix and the second matrix.

9. The method of claim 8, wherein the first spatial pattern is a uniform spatial pattern.

10. The method of claim 8, wherein the second spatial pattern is a non-uniform spatial pattern.

11. The method of claim 8, wherein each of the first spatial pattern and the second spatial pattern is a non-uniform spatial pattern.

12. The method of claim 8, wherein the light source illuminates the target using N temporal modulation frequencies with the first spatial pattern and one temporal modulation frequency with the second spatial pattern.

13. The method of claim 11, wherein the non-uniform spatial pattern is at least one of a dot-pattern, a vertical line pattern, and a horizontal line pattern.

14. The method of claim 8, further comprising determining a distance of the target based on the one or more parameters of the direct component of light and the global component of light.

15. The method of claim 8, wherein illuminating the target with less than N temporal modulation frequencies with the second spatial pattern further comprising illuminating a target using one modulation frequency with the second spatial pattern.

16. A physical article of manufacture including one or more tangible computer-readable storage media, encoding computer-executable instructions for executing on a computer system a computer process, the computer process comprising:

illuminating a target using N temporal modulation frequencies with the first spatial pattern and with less than N temporal modulation frequencies with the second spatial pattern;

acquiring a first image represented by a first matrix in response to illuminating the target with a light source using the first spatial pattern;

acquiring a second image represented by a second matrix in response to illuminating the target with the light source using the second spatial pattern, the second spatial pattern being different than the first spatial pattern; and determining one or more parameters of the direct component of light and the global component of light based on analysis of the first matrix and the second matrix.

17. The physical article of manufacture of claim 16, wherein the first spatial pattern is a uniform spatial pattern and the second spatial pattern is a non-uniform spatial pattern.

18. The physical article of manufacture of claim 17, wherein the light source illuminates the target using N temporal modulation frequencies with the uniform spatial pattern and one temporal modulation frequency with the non-uniform spatial pattern.

19. The physical article of manufacture of claim 16, wherein each of the first spatial pattern and the second spatial pattern is a non-uniform spatial pattern.

20. The physical article of manufacture of claim 19, wherein the light source illuminates a target using N temporal modulation frequencies with the uniform spatial pattern and N temporal modulation frequencies with the non-uniform spatial pattern.

* * * * *